US010037319B2

(12) United States Patent
Medlock et al.

(10) Patent No.: US 10,037,319 B2
(45) Date of Patent: Jul. 31, 2018

(54) USER INPUT PREDICTION

(71) Applicant: TOUCHTYPE LIMITED, London (GB)

(72) Inventors: Benjamin William Medlock, London (GB); Joseph Hayyim Benedict Osbourne, Kent (GB)

(73) Assignee: TOUCHTYPE LIMITED, London (GB)

(*) Notice: Subject to any disclaimer, the term of this patent is extended or adjusted under 35 U.S.C. 154(b) by 364 days.

(21) Appl. No.: 14/341,717

(22) Filed: Jul. 25, 2014

(65) Prior Publication Data

US 2014/0351741 A1 Nov. 27, 2014

Related U.S. Application Data

(63) Continuation-in-part of application No. PCT/GB2013/050182, filed on Jan. 28, 2013, and a
(Continued)

(30) Foreign Application Priority Data

Sep. 29, 2010 (GB) .................................. 1016385.5
Jan. 26, 2012 (GB) .................................. 1200643.3
(Continued)

(51) Int. Cl.
*G06F 3/048* (2013.01)
*G06F 17/27* (2006.01)
(Continued)

(52) U.S. Cl.
CPC .......... *G06F 17/276* (2013.01); *G06F 3/0237* (2013.01); *G06F 3/04886* (2013.01); *G06F 17/273* (2013.01)

(58) Field of Classification Search
CPC .. G06F 17/276; G06F 3/0237; G06F 3/04886; G06F 17/273
See application file for complete search history.

(56) References Cited

U.S. PATENT DOCUMENTS 6,621,424 B1 9/2003 Brand
2003/0097252 A1* 5/2003 Mackie ............... G06F 17/2755
704/9
(Continued)

FOREIGN PATENT DOCUMENTS

CN 1518829 A 8/2004
CN 101122901 A 2/2008
(Continued)

OTHER PUBLICATIONS

International Application No. PCT/GB2013/050182; International Search Report and Written Opinion; dated Apr. 25, 2013; 13 pages.
(Continued)

*Primary Examiner* — Anil N Kumar
(74) *Attorney, Agent, or Firm* — Schwegman Lundberg & Woessner, P.A.

(57) ABSTRACT

A system for inputting text into an electronic device. The system comprises a candidate generator (2) configured to generate one or more candidates from an input sequence (20). The input sequence (20) comprises a contiguous sequence of characters. Each candidate comprises two or more terms separated by one or more term boundaries. The candidate generator (2) is configured to assign a first probability estimate to each candidate by: searching for one or more terms of that candidate in a context language model, wherein the context language model comprises sequences of terms, each sequence of terms having a corresponding probability of occurring; and assigning the probability corresponding to the one or more terms of that candidate from the context language model to the candidate. The candidate
(Continued)

generator (2) is configured to discard one or more candidates on the basis of the corresponding first probability estimates. There is provided a corresponding method of inferring term boundaries in a user input sequence.

25 Claims, 13 Drawing Sheets

Related U.S. Application Data continuation-in-part of application No. 13/876,159, filed as application No. PCT/GB2011/001419 on Sep. 29, 2011, now Pat. No. 9,384,185, and a continuation-in-part of application No. 14/372,445, filed as application No. PCT/GB2012/052981 on Nov. 30, 2012.

(30) Foreign Application Priority Data

Jan. 27, 2012 (GB) .................................. 1205598.4
Mar. 29, 2012 (GB) .................................. 1201425.4

(51) Int. Cl.
*G06F 3/0488* (2013.01)
*G06F 3/023* (2006.01)

(56) References Cited

U.S. PATENT DOCUMENTS

2004/0201607 A1   10/2004   Mulvey et al.
2005/0273724 A1*  12/2005   Joeressen ............. G06F 3/0236
                                                715/773
2008/0126075 A1*   5/2008   Thorn .................. G06F 3/0237
                                                704/3
2008/0259022 A1*  10/2008   Mansfield ............. G06F 3/0237
                                                345/156
2009/0174667 A1*   7/2009   Kocienda ............. G06F 3/0237
                                                345/169
2009/0193334 A1*   7/2009   Assadollahi .......... G06F 17/276
                                                715/261
2011/0197128 A1    8/2011   Assadollahi
2012/0167009 A1    6/2012   Davidson et al.

FOREIGN PATENT DOCUMENTS

JP          3403838 B2         5/2003
WO     WO 1999/059310         11/1999
WO     WO 2011/042710 A1       4/2011
WO     WO 2011/107751 A2       9/2011
WO     WO 2011/143827 A1      11/2011
WO     WO 2012/042217 A1       4/2012

OTHER PUBLICATIONS

"Second Office Action and Search Report Issued in Chinese Patent Application No. 201380006966.X", dated Dec. 14, 2016, 16 Pages.
Japan Patent Application No. 2014-553807; Office Action—Notice of Reasons for Refusal; dated Jan. 23, 2017; 9 pages.

* cited by examiner

When you get the chance, plebsecalkme|

[please call me] [please call Melanie]

When you get the chance, please calkmebac|

[call me back] [calkmebac]

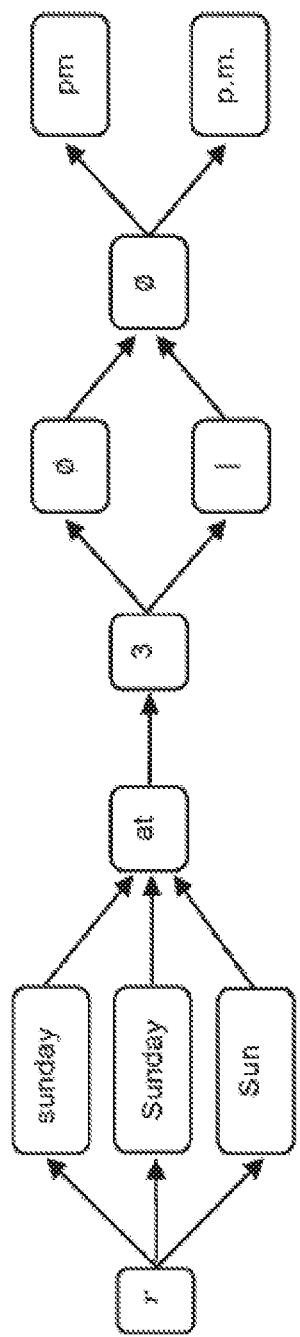
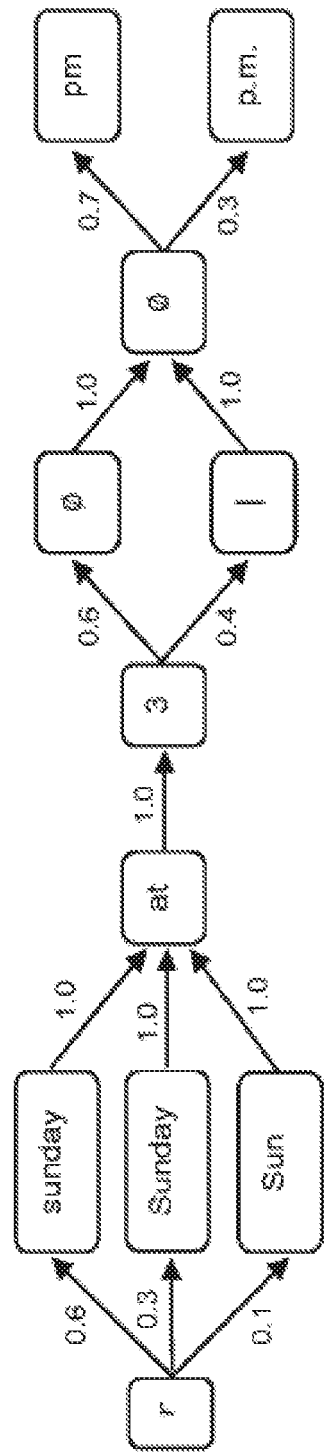
FIG. 9A
FIG. 9B

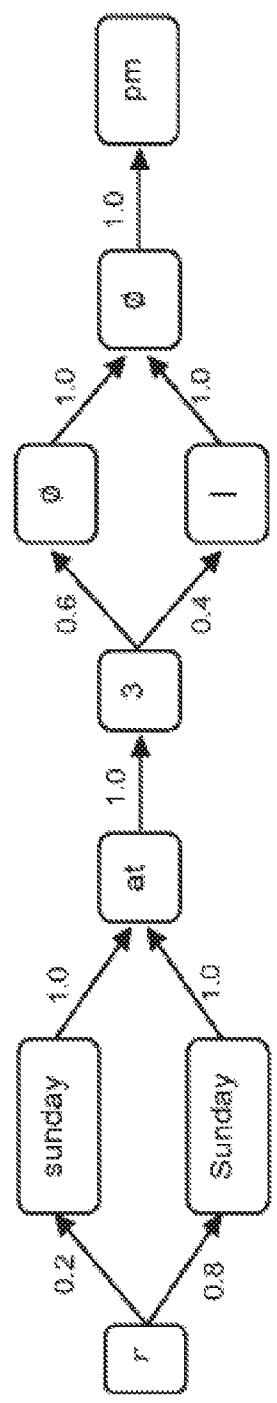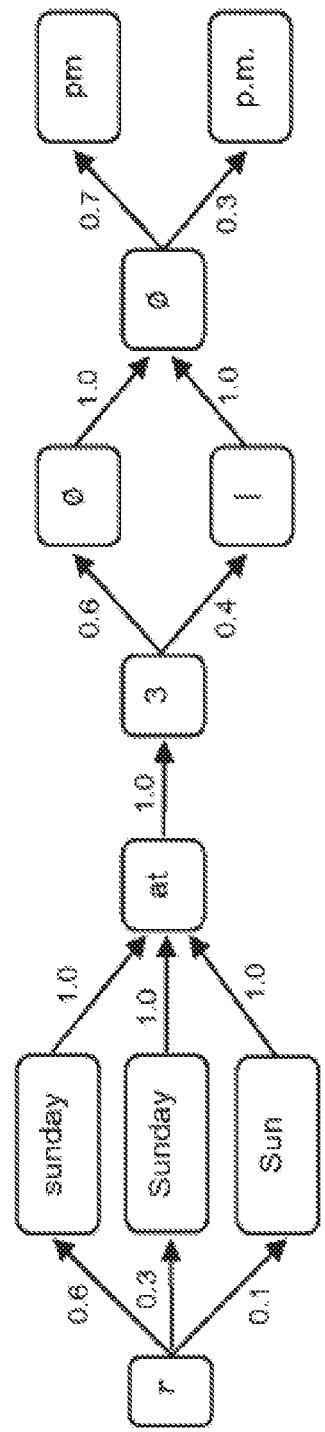
FIG. 10C
FIG. 10D

When you get this, send me are|

*FIG. 12*

USER INPUT PREDICTION

CROSS REFERENCE TO RELATED APPLICATIONS

This application is a continuation-in-part of International Application No. PCT/GB2013/050182, filed Jan. 28, 2013, which claims priority to Great Britain Patent Application No. 1205598.4, filed Mar. 29, 2012, and Great Britain Patent Application No. 1201425.4, filed Jan. 27, 2012, the disclosures of which are incorporated herein by reference in their entirety; and is a continuation-in-part of U.S. patent application Ser. No. 13/876,159, filed Mar. 26, 2013, which is a National Stage of International Application No. PCT/GB2011/001419, filed Sep. 29, 2011, which claims priority to Great Britain Patent Application No. 1016385.5, filed Sep. 29, 2010, the disclosures of which are incorporated herein by reference in their entirety; and is a continuation-in-part of U.S. patent application Ser. No. 14/372,445, filed Jul. 15, 2014, which is a National Stage of International Application No. PCT/GB2012/052981, filed Nov. 30, 2012, which claims priority to Great Britain Patent Application No. 1200643.3, filed Jan. 16, 2012, the disclosures of which are incorporated herein by reference in their entirety.

FIELD OF THE INVENTION

The present invention relates to a system and method for predicting multiple terms from user inputted text and, in particular, it relates to a system and method for predicting one or more term boundaries in user inputted text.

BACKGROUND

There are known systems which have some form of detecting term boundaries in user inputted text, for example the Android™ ICS keyboard from Google™ or the iOS keyboard from Apple™. However, these systems have limitations on the detection of term boundaries.

For the example of the Android™ ICS keyboard from Google™, if the user has entered two valid words from the underlying vocabulary, without a separating space or separated by a character other than space, the system will offer the two words separated by a space, replacing the erroneous character if relevant. However, there are a number of limitations of this system, in particular:

it does not work if either word is mistyped or misspelt;
it does not work with other input manipulation functions, such as automatic apostrophe insertion; and
it only allows two words to be analysed at once, i.e. it can only identify a single word boundary.

The iOS keyboard from Apple™ it is more advanced than the Android™ version in that it can compensate for limited mistyping or misspelling. However, the iOS keyboard is also limited to identifying a single word boundary.

An object of the present invention is to overcome one or more of these limitations, thereby allowing a user to enter entire phrases and even whole messages without explicit insertion of term boundaries.

SUMMARY OF THE INVENTION

In a first aspect of the present invention, there is a system for inputting text into an electronic device comprising:
a candidate generator configured to:
generate one or more candidates from an input sequence, the input sequence comprising a contiguous sequence of characters, wherein each candidate comprises two or more terms separated by one or more term boundaries;
assign a first probability estimate to each candidate by:
searching for one or more terms of that candidate in a context language model, wherein the context language model comprises sequences of terms, each sequence of terms having a corresponding probability of occurring, and
assigning the probability corresponding to the one or more terms of that candidate from the context language model to the candidate; and
discard one or more candidates on the basis of the corresponding first probability estimates.

In one embodiment, the one or more terms comprises the candidate. Preferably, for each candidate, the candidate generator is configured to search in the context language model for a sequence comprising a context sequence in combination with the candidate, wherein the context sequence is user inputted text that precedes the input sequence and comprises one or more terms separated by one or more term boundaries.

The system may further comprise an input sequence generator configured to convert user input signals into an input sequence and a context sequence. The input sequence generator preferably converts the user input signals into an input sequence by generating a sequence of sets of characters, each set of characters having a probability distribution over the characters in the set, such that there is a probability value associated with each character in each set.

The candidate generator is preferably configured to generate one or more candidates from an input sequence by converting the input sequence into a probabilistic constrained sequence graph comprising one or more paths, wherein the one or more paths correspond to the one or more candidates. The probabilistic constrained sequence graph is preferably a variant of a directed acyclic graph comprising a collection of nodes and directed edges, each edge connecting one node to another, wherein in the probabilistic constrained sequence graph each character of each set of characters is assigned a node, the incoming edge for each node corresponding to the probability for the associated character. Each path of the probabilistic graph is preferably constrained to be the same length.

The candidate generator is preferably configured to insert one or more term boundary nodes into the probabilistic constrained sequence graph, each of the one or more term boundary nodes having a probability t of occurring in the input sequence. Preferably, the candidate generator is configured to insert a term boundary node between any two neighbouring nodes which correspond to any two neighbouring sets of characters of the input sequence. Furthermore, the candidate generator may be configured to insert a term boundary node as an alternative to any node that represents a set of characters of the input sequence.

The candidate generator is preferably configured to insert one or more wildcard nodes into the probabilistic constrained sequence graph, each of the one or more wildcard nodes enabling any character to be inserted into the probabilistic constrained sequence graph in addition to the sets of characters of the input sequence.

The candidate generator may be configured to generate a second probability estimate for the candidate by determining the cumulative probability of the path through the probabilistic constrained sequence graph that represents that candidate. The candidate generator is preferably configured to combine first and second probabilities for each candidate.

Preferably, the candidate generator is configured to discard a candidate by:
  determining the combined probability for the most probable candidate;
  determining the combined probability for the candidate in question; and
  discarding the candidate if a ratio of the combined probability for the most probable candidate and the candidate in question is less than a threshold value t.

The candidate generator may be configured to determine a third probability for any candidate which has not been discarded. The third probability may be determined by searching in the context language model for a sequence comprising a context sequence, and valid orthographic and lexical variations thereof, in combination with the candidate, wherein the context sequence is user inputted text that precedes the input sequence and comprises one or more terms separated by one or more term boundaries. The overall probability of a candidate may be the product of the second and third probabilities.

One or more of the most probable candidates may be outputted from the candidate generator to a candidate display for presentation to a user.

In one embodiment, the term boundary is a space character.

In a second aspect of the present invention, there is a method of inferring term boundaries in an input sequence comprising a contiguous sequence of characters, the method comprising:
  generating using a candidate generator one or more candidates from the input sequence, wherein each candidate comprises two terms separated by one or more term boundaries;
  assigning a first probability estimate to each candidate by:
    searching for one or more terms of that candidate in a context language model, wherein the context language model comprises sequences of terms, each sequence of terms having a corresponding probability of occurring, and
    assigning the probability corresponding to the one or more terms of that candidate from the context language model to the candidate; and
  discarding one or more candidates on the basis of the corresponding first probability estimates.

In one embodiment, the one or more terms comprises the candidate. For each candidate, the step of searching for the candidate in the context language model preferably comprises searching for a sequence comprising a context sequence in combination with the candidate, wherein the context sequence is user inputted text that precedes the input sequence and comprises one or more terms separated by one or more term boundaries.

The method preferably comprises converting, using an input sequence generator, user input signals into an input sequence and a context sequence. Converting the user input signals into an input sequence preferably comprises generating a sequence of sets of characters, each set of characters having a probability distribution over the characters in the set, such that there is a probability value associated with each character in each set.

Generating one or more candidates from an input sequence may comprise converting the input sequence into a probabilistic constrained sequence graph comprising one or more paths, wherein the one or more paths correspond to the one or more candidates. The probabilistic constrained sequence graph is preferably a variant of a directed acyclic graph comprising a collection of nodes and directed edges, each edge connecting one node to another, wherein in the probabilistic constrained sequence graph each character of each set of characters is assigned a node, the incoming edge for each node corresponding to the probability for the associated character. Each path of the probabilistic graph is preferably constrained to be the same length.

The method preferably further comprises inserting using the candidate generator one or more term boundary nodes into the probabilistic constrained sequence graph, each of the one or more term boundary nodes having a probability t of occurring in the input sequence. The term boundary node is preferably inserted between any two neighbouring nodes which correspond to any two neighbouring sets of characters of the input sequence.

The term boundary node may be inserted as an alternative to any node that represents a set of characters of the input sequence.

The method preferably further comprises inserting using the candidate generator one or more wildcard nodes into the probabilistic constrained sequence graph, each of the one or more wildcard nodes enabling any character to be inserted into the probabilistic constrained sequence graph, in addition to the sets of characters of the input sequence.

The method preferably further comprises generating using a candidate generator a second probability estimate for the candidate by determining the cumulative probability of the path through the probabilistic constrained sequence graph that represents that candidate. The candidate generator may be used to determine the product of the first and second probabilities for each candidate.

Preferably, discarding a candidate comprises:
  determining using the candidate generator the combined probability for the most probable candidate;
  determining using the candidate generator the combined probability for the candidate in question; and
  discarding using the candidate generator the candidate if a ratio of the combined probability for the most probable candidate and the candidate in question is less than a threshold value t.

Preferably, the method further comprises determining using the candidate generator a third probability for any candidate which has not been discarded. The third probability may be determined by searching, using the candidate generator, in the context language model for a sequence comprising a context sequence, and valid orthographic and lexical variations thereof, in combination with the candidate, wherein the context sequence is user inputted text that precedes the input sequence and comprises one or more terms separated by one or more term boundaries. The overall probability of a candidate may be determined by multiplying the second probability by the third probability.

The method may comprise outputting from the candidate generator one or more of the most probable candidates to a candidate display for presentation to a user.

In one embodiment, the term boundary is a space character.

In a third aspect of the present invention, there is a computer program product comprising a computer readable medium having stored thereon computer program means for causing a processor to carry out the method as described above.

In a fourth aspect of the present invention, the is a user interface comprising:
  a text pane configured to display text that is currently being entered by a user;

a prediction pane to display a candidate, wherein the candidate is a prediction of what the text that is currently being entered by a user is intended to represent;

a virtual keyboard for accepting text entered by a user, wherein the keyboard does not include a key representing a space bar.

Preferably, the prediction pane comprises two prediction panes, the first displaying the user input sequence and the second displaying a prediction for that user input sequence.

BRIEF DESCRIPTION OF THE DRAWINGS

The present invention will now be described in detail with reference to the accompanying drawings, in which:

FIG. 2a illustrates an example interface in accordance with the present invention.

FIG. 2b illustrates an example interface in accordance with the present invention.

FIGS. 9a and 9b illustrate example probabilistic constrained sequence graph, in accordance with some embodiments.

FIGS. 10a, 10b, 10c, and 10d illustrate example steps for the construction of a probabilistic constrained sequence graph, in accordance with some embodiments.

FIG. 12 illustrates an example of an input display field, in accordance with some embodiments.

DETAILED DESCRIPTION OF THE INVENTION

The present invention provides a system and method for text entry on an electronic device, such as a mobile phone or tablet, whereby a probabilistic contextual model is used to infer likely locations of term boundaries in text input.

The present system incorporates a method of generating multiple-term boundary-inferred results from an underlying vocabulary with a probabilistic method of filtering these results based on contextual linguistic data.

This system is preferably combined with additional probabilistic character manipulation, such as that described in international patent application no. PCT/GB2011/001419 (which is hereby incorporated by reference in its entirety), to yield a system that is capable of concurrently correcting mistyping or misspelling and is also capable of other probabilistically derived character stream manipulation (such as automatic apostrophe insertion in English). The system is therefore able to generate (and provide to a user or a system) high-probability multi-term text predictions.

Thus, the present system and method provides both a means for users to increase their input rate by removing the need to manually separate words, and provides corrective feedback to users who attempt to do so, but fail (where the user inserted a spurious character in place of a separation; or where the user failed to insert any character or separation for example).

The following examples demonstrate the output (text predictions of one or more terms) of the system and method of the present invention, given a number of example user text inputs. The examples demonstrate the capability of the system/method over a number of different text input scenarios, such as user input text with no term boundaries, text input with spurious characters in place of boundaries, etc.

An example of text input by a user without term boundaries:

For the user input "seeyoulater", the system/method predict/outputs "see you later"

An example of text input by a user with spurious characters in place of boundaries:

For the user input "seecyoublater", the system/method predicts/outputs "see you later"

The disclosed system and method can also resolve prefix matches in real time, for example:

For the user input "seeyoula", the system/method predicts/outputs "see you later"

The disclosed system/method can compensate for mistyping/misspelling errors while at the same time inferring word boundaries and prefixes, for example:

For the user text input "seeyooulayer", the system/method predicts/outputs "see you later"

For the user text input "whatstheti", the system/method predicts/outputs "what's the time"

The system/method may be configured to generate a probabilistically ranked set of one or more predictions for presentation to the user. For example, from the user input "thedrmin", the system/method may output the following ranked predictions:

"these mints"
"the seminar"
<etc>

Figure 1:
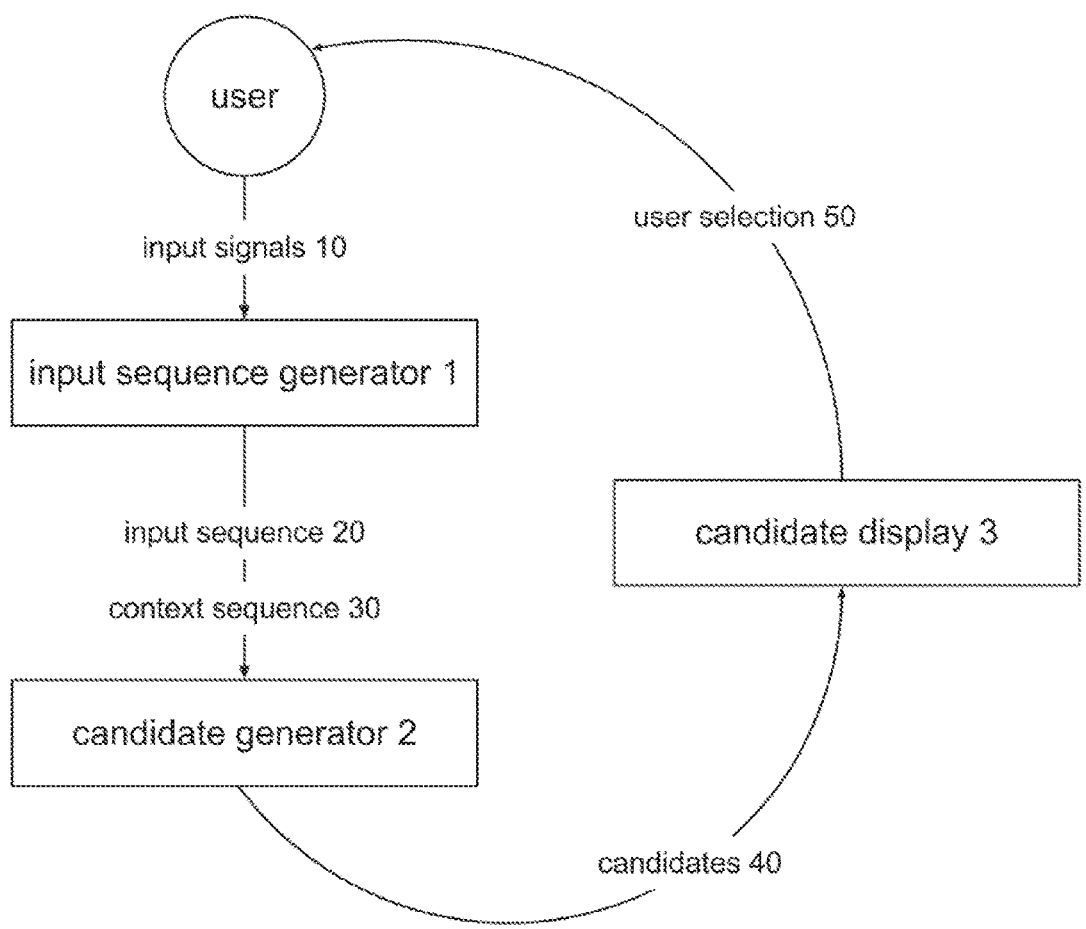
FIG. 1 is a schematic of a high-level prediction architecture according to the invention.

In general, but not exclusive terms, an overview of the present system is shown in FIG. 1.

The system is preferably designed to augment an existing probabilistic text entry system, such as that described in international patent application no. PCT/GB2011/001419, which is hereby incorporated by reference in its entirety. However, it may be used alone, for example simply to augment an existing text entry system such as those discussed in the background section of this application.

As shown in FIG. 1, the system comprises a Candidate Generator 2. Preferably, the system also comprises an Input Sequence Generator 1 and a Candidate Display 3. The Candidate Display 3 is configured to display one or more candidates 40 to a user.

The Input Sequence Generator 1 is configured to generate a text sequence from user input. User input can be generated by a range of user signals 10 corresponding to different types of interaction with a range of different electronic devices, given different types of text entry interface, for example:

a QWERTY (or other layout) keyboard, as known in the art a probabilistic virtual QWERTY (or other layout) keyboard, as known in the art a more sophisticated keypress model (e.g. GB application 1108200.5, "User Input Prediction", which is hereby incorporated by reference in its entirety)

a probabilistic continuous stroke interface (e.g. GB application 1200643.3, "System and method for inputting text", which is hereby incorporated by reference in its entirety)

The Input Sequence Generator 1 accepts input signals 10 generated by a user and returns structured sequences of characters in a given language. The Input Sequence Generator 1 outputs two structured sequences of characters: an input sequence 20 and a context sequence 30.

The context sequence 30 comprises a fixed sequence of characters. The input sequence 20 is in the form of what will be referred to herein as a probabilistic string. The probabilistic string comprises a sequence of sets of characters, each set having a probability distribution over its character members, such that each character in each set has a probability value associated with it. An example is shown below in which the probabilistic string comprises a sequence over three sets of characters, each set (denoted by {-}) having two or more characters with corresponding probabilities that sum to 1:

{{{a, 0.8},{s, 0.1},{z, 0.1} }, {{r, 0.9},{t, 0.05},{f, 0.05} }, {{e, 0.8},{w, 0.2} }}

Figure 5:
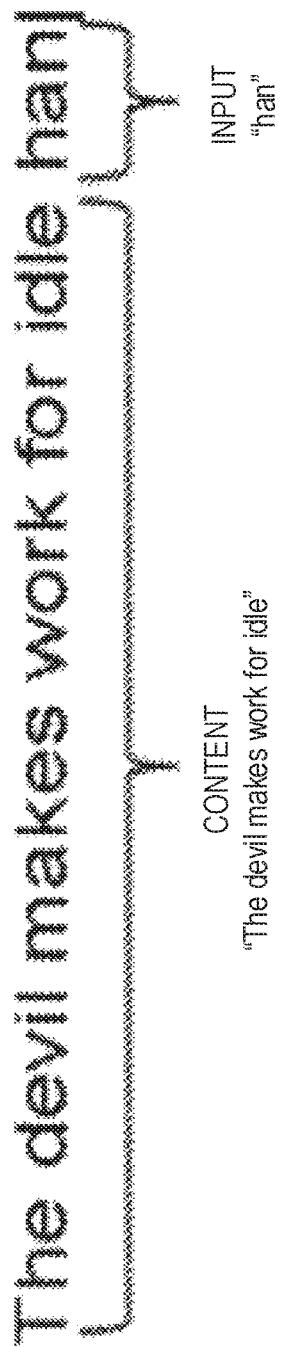
FIG. 5 is an illustrates an example context sequence and input sequence, in accordance with some embodiments.

By way of example, the user has entered the sequence "The devil makes work for idle han" with the cursor located immediately after "han". For this example, the context sequence 30 would be the characters up to and including the word "idle" and the input sequence 20 would be a distribution over characters that may have been intended by the letters 'h' 'a' and 'n', as illustrated in FIG. 5.

In general, the context sequence 30 can be considered as the text that has already been committed by the user, and the input sequence 20 can be considered to be the text the user is currently trying to enter. The input sequence 20 is a contiguous sequence of characters. A contiguous sequence of characters is a continuous sequence of characters without explicit term boundaries. The Candidate Generator 2 is configured to provide replacement for the whole of the input sequence 20 with a prediction of two or more terms with one or more inferred term boundaries between the two or more terms, which may include the replacement of an erroneous character with a space, correction of one or more of the terms, and/or insertion of punctuation.

For example, if the user has already committed the wording "The devil makes" to the system and was currently entering "workforidlehan", the context sequence 30 is "The devil makes", whereas the input sequence 20 corresponds to "workforidlehan".

Thus, the Input Sequence Generator 1 is configured to generate a context sequence 30 corresponding to text committed to the system by the user (e.g. by previous user selection 50 of a candidate prediction 40) and a an input sequence 20 corresponding to text the user is currently entering but has yet to commit to the system, in the form of a contiguous sequence of characters.

The context and input sequences 30, 20 are outputted from Input Sequence Generator 1 and accepted as input by the Candidate Generator 2.

The Candidate Generator 2 is configured to generate one or more candidate predictions 40, each candidate prediction corresponding to multi-term sequences in which term boundaries are inferred where required. To achieve this, the Candidate Generator 2 is configured to rank sequences by the likelihood that the user intends/intended to enter them.

This equates to a ranking over sequences in a set governed by the following:

$$P(s \in S | e, M) \qquad (1)$$

where e is the observed evidence, and M is the set of trained models that will be used to make probabilistic inferences. In other words, the system will estimate the conditional probability, over the set of all sequences from which predictions can be drawn, of the sequence given the evidence. Expression (1) is rearranged using Bayes Theorem to yield:

$$\frac{P(e | s, M) P(s | M)}{P(e | M)} \qquad (2)$$

Marginalising over target sequences in the denominator yields:

$$\frac{P(e | s, M) P(s | M)}{\sum_{j=1}^{|S|} P(e | s_j, M) P(s_j | M)} \qquad (3)$$

In order to compute P(e|s,M), it is assumed that the evidence can be separated into disjoint sets, $[e_1 \ldots e_N]$, that are independently generated from some distribution under an associated model, given the target sequence. Thus the following assumption is made:

Assumption 1: Evidence can be separated into distinct sets, such that the evidence in each set is conditionally independent of all others, given the target sequence.

each $e_i$ has a model $M_i$ associated with it.

This independence assumption is expressed mathematically as follows:

$$P(e | s, M) = \prod_{i=1}^{N} [P(e_i | s, M_i \in M)] \qquad (4)$$

This allows construction of a framework which allows many sources of evidence to be combined, each having an appropriate model.

Preferably, a model R∈M is associated with the target sequence prior. Given this, and the above assumption, expression (3) can be restated as:

$$\frac{P(s | R) \prod_{i=1}^{N} P(e_i | s, M_i)}{\sum_{j=1}^{|S|} P(s_j | R) \prod_{i=1}^{N} P(e_i | s_j, M_i)} \qquad (5)$$

The denominator in expression (5) is constant with respect to s, and therefore has no effect on the ranking, serving only as a normalisation factor on resultant probability values. When implementing the disclosed system, this value can be estimated as an approximation, as described below with respect to expression (11) to provide normalised probability values. However, since it does not affect the ranking, it is not necessary for the system of the present invention to estimate the denominator, since a ranking of the text predictions may be sufficient.

Given expression (5) above, the target sequence prior $P(s|R)$ must be computed along with each of the evidence likelihoods $P(e_i|s, M_i)$ for each evidence source $e_i$ and associated model $M_i$.

The disclosed system provides two methods for computing evidence likelihoods within a probabilistic framework by marginalising over candidate interpretations of the evidence: Candidate Model 1 and Candidate Model 2.

Candidate Model 1

When forming an estimate of the likelihood of the evidence from a single evidence source, it is often helpful to express the model in terms of 'candidates', which are intermediate stages between the 'user-intended' sequence, and the observed evidence. The likelihood can be re-written as:

$$P(e|s,M) = \Sigma_{j=1}^{K} P(e|c_j, s, M_{candidate}) P(c_j|s, M_{sequence}) \qquad (6)$$

where $c_j$ is a single candidate, and we now have two submodels of M for a given evidence source: the candidate model $M_{candidate}$ and the sequence model $M_{sequence}$. The key assumption here is as follows:

Assumption 2: The likelihood, under the model in question, can be expressed as a marginalization over candidates, where the evidence is conditionally independent of the target sequence, given the candidate.

Applying this assumption, the dependence on s can be dropped from the evidence term:

$$P(e|s,M) = \Sigma_{j=1}^{K} P(e|c_j, s, M_{candidate}) P(c_j|s, M_{sequence}) \qquad (7)$$

Candidate Model 2

Another variant of the candidate model first transforms the evidence likelihood using Bayes' rule:

$$P(e|s, M) = \frac{P(s|e, M) P(e|M)}{P(s|M)} \qquad (8)$$

The evidence conditional sequence probability can be re-written as:

$$P(s|e,M) = \Sigma_{j=1}^{K} P(s|c_j, e, M_{sequence}) P(c_j|e, M_{candidate}) \qquad (9)$$

where $c_j$ is a single candidate, and we now have two submodels of M for a given evidence source: the candidate model $M_{candidate}$ and the sequence model $M_{sequence}$. In this case, the key assumption is:

Assumption 3: The likelihood, under the model in question, can be expressed as a marginalization over candidates, where the target sequence is conditionally independent of the evidence, given the candidate.

Applying this assumption, the dependence on s can be dropped from the evidence term:

$$P(s|e,M) = \Sigma_{j=1}^{K} P(s|c_j, M_{sequence}) P(c_j|e, M_{candidate}) \qquad (10)$$

The candidate generator 2 uses evidence from two sources: context and input, which correspond to the context sequence 30 and input sequence 20 output by the input sequence generator 1.

As discussed above, the context represents the observed evidence about what the user has already entered, and is in the form of a sequence of characters with term boundaries if the context sequences comprising multiple words. The input represents the observed evidence about what the user is currently entering, and is in the form of a probabilistic string.

Instantiating expression (5) with these two evidence sources yields:

$$\frac{P(s|R)P(\text{context}|s, M_{context})P(\text{input}|s, M_{input})}{Z} \qquad (11)$$

In this expression, Z, which is optional as it does not affect the ranking, represents the normalization factor, the estimation of which is explained in further detail in PCT/GB2011/001419 which is hereby incorporated by reference in its entirety. In particular, the normalisation constant Z is approximate to:

$$\Sigma_{j=1}^{|S|} P(s_j|R) P(\text{context}|s_j, M_{context}) P(\text{input}|s_j, M_{input})$$

This approximation may be implemented in the system as follows. A function z is considered over a set of sequences T, such that:

$$z(T) = \Sigma_{j=1}^{|T|} P(s_j|R) P(\text{context}|s_j, M_{context}) P(\text{input}|s_j, M_{input})$$

Z is computed as:

$$Z = z(T) + z(\{u\}) * k$$

where u represents an "unknown" sequence, and k is an estimate of $|S|-|T|$, where $|S|$ is the number of sequences in the set of all possible target sequences, and $|T|$ is the number of sequences for which at least one of the underlying evidence models has a "known" estimate. Each individual evidence conditional model M will return an estimate of $P(e|u,M)$, i.e. a distribution over evidence observations given the "unknown" sequence. In essence, this means that each evidence conditional model is responsible for its own distributional smoothing, but this must be related to k which is proportional to the overall estimated number of "unknown" sequences. In practice, each model will "know" about a set of sequences S' where $S' \subset S$, and estimates of $P(e|s, M)$ will be constant and equivalent to $P(e|u,M)$ for all $s \notin S'$. Smoothing of this nature allows the system takes into account varying levels of confidence in the models associated with each evidence source.

Within the model framework described above, the disclosed system implements three models:

The target sequence prior model R consists of:

Unigram model—implements a distribution over sequences in a language without taking context into account, internally treating each sequence as an atomic unit, e.g. a unigram model is an n-gram of size 1.

The input evidence model $M_{input}$ is comprised of two models:

Candidate Model: $M_{input\text{-}candidate}$—implements a conditional distribution over input observations given a particular candidate interpretation.

Sequence Model: $M_{input\text{-}sequence}$—implements a conditional distribution over candidates given an intended target sequence.

The context evidence model $M_{context}$ is comprised of two models:

Candidate Model: $M_{context\text{-}candidate}$—implements a conditional distribution over context observations given a particular candidate interpretation.

Sequence Model: $M_{context\text{-}sequence}$—implements a conditional distribution over sequences in a language, or set of languages, given a particular context.

The Candidate Generator 2 is configured to compute the individual estimates in the numerator of expression (11) in order to determine which candidates 40 have the highest-ranking probabilities, one or more of these candidates being displayed on a Candidate Display 3 as a text prediction.

Below, a discussion of how each of the relevant individual probabilities in expression (11) is calculated are provided. Thus, the calculation of each of the following terms is discussed: the input likelihood $P(\text{input}|s, M_{input})$; the context likelihood $P(\text{context}|s, M_{context})$; and the target sequence prior estimate $P(s|R)$. The calculation of Z is optional, and so is not discussed in detail.

Target Sequence Prior

The target sequence prior is preferably computed as follows:

$$P(s|R) = \begin{cases} P(s|R_{unigram}) & \text{if } (s \in V) \\ P(s|R_{character}) & \text{otherwise} \end{cases}$$

where V is the set of sequences contained in $R_{unigram}$ and the implementation of the models is according to known techniques for constructing smoothed frequency-based unigram language models and smoothed Markov chain character models. A number of applicable techniques for implementing these models are listed below. However, other suitable techniques not listed also apply.

- Smoothed n-gram term or character models (known in the art).
- Adaptive multi language models as described in <ref: UK patent application no. 0917753.6>.
- PPM (prediction by partial matching) language models, as described in e.g. <ref:Scheffler 2008>.
- Morphological analysis engines configured to generate sequences probabilistically from constituent lexical components.

By including a target sequence prior model R, the system provides an improved accuracy of intended sequence prediction. Furthermore, the target sequence prior model R enables character-based inference of unseen target sequences, i.e. the system is better able to infer unknown target sequences to approximate across all possible target sequences.

Input Likelihood, $P(\text{input}|s, M_{input})$

The input likelihood, $P(\text{input}|s, M_{input})$, is estimated by means of candidate model 1 and in particular expression (7):

$$P(\text{input}|s, M_{input}) = \sum_{j=1}^{K} P(\text{input}|c_j, M_{input\text{-}candidate}) P(c_j|s, M_{input\text{-}sequence}) \quad (12)$$

Where the evidence source, e, of expression (7) is the input, input sequence 20, and the associated model is the input model $M_{input}$ comprising $M_{input\text{-}candidate}$ and $M_{input\text{-}sequence}$.

Thus, to determine the input likelihood, $P(\text{input}|s, M_{input})$, it is necessary to determine an input candidate estimate, $P(\text{input}|c_j, M_{input\text{-}candidate})$, and an input sequence estimate, $P(c_j|s, M_{input\text{-}sequence})$, each of which are discussed in detail below.

Input Candidate Estimate, $P(\text{input}|c_j, M_{input\text{-}candidate})$

PCT/GB2011/001419, which is hereby incorporated by reference in its entirety, describes a probabilistic constrained sequence graph (PCSG)—a variant of a directed acyclic graph (DAG), where each node contains a subsequence consisting of one or more characters. The subsequence consisting of one or more characters corresponds to an individual character from a set of characters or a sequence across two or more of the sets of characters of the input sequence 20. Each of the edges to the nodes is assigned a probability, on the basis of the probability distribution(s) across the characters in the set(s) of characters of the input sequence 20. A PCSG also has the property that each path is constrained to be the same length.

Formally, a PCSG consists of a 4-tuple containing a set of nodes N, a root node r, a set of directed edges E, and a set of parameters (probabilities) θ:

$$G = (N, r, E, \theta) \quad (17)$$

An edge between two nodes n and n' is denoted by (n→n'), and the probability of moving from n to n' along the edge is denoted by P(n'|n). A path through G begins at node r and follows exactly one outgoing edge from each visited node until reaching a node that contains no outgoing edges. The following properties hold of G:

1) G is a directed, acyclic graph (DAG)
2) $\forall n \in N. \exists m.(m \rightarrow n) \in E \Rightarrow n=r$ i.e. all nodes except for the root must have at least one incoming edge.
3) $\exists m, k \in N. \forall n \in N. (m \rightarrow n) \in E \Rightarrow (n \rightarrow k) \in E$ i.e. all paths branching from a given node rejoin immediately at a subsequent common node. This property severely constrains the structure of the graph and implies that all paths have the same length, mitigating normalisation requirements on path probability computations.

The input candidate model function computes the probability of a given path as follows (equated with the input candidate estimate):

$$P(\text{input}|c_j, M_{input\text{-}candidate}) f_{input\text{-}candidate}(c_j) = P(p_j|G)$$

where $P(p_j|G)$ is the path likelihood, computed as the product of each of the edges in the path:

$$P(p_j|G) = P(n_1|r) \Pi_{k=2}^{K} = P(n_k|n_{k-1}) \quad (19)$$

where K is the number of edges in the path. It can be noted that this preferred formulation amounts to an implicit independence assumption between nodes. This implicit independence is described below, after the illustration of an example PCSG.

Hence, the following property holds over the probabilities on edges:

$$\forall n \in N. \Sigma_{(n \rightarrow m) \in E} P(m|n) = 1$$

In other words, the probabilities on all outgoing edges from a given node n must sum to one. This also implies that the following holds: $\Sigma_i P(p_i \beta G) = 1$ i.e. the sum over the probability of all paths in the PCSG equals one.

In the disclosed system, the set of input candidates is represented as an extended PCSG (EPCSG). An individual input candidate is represented by a unique path through the EPCSG. For each input candidate, the normalised probability of its representative path may be computed.

A PCSG is first generated from the input sequence 20 (mappable to a set of input candidates). The PCSG is then augmented with additional structures allowing more expressive, yet still constrained, candidates.

Below is provided an example of a PCSG for the scenario where the input sequence is:

$$\begin{bmatrix} \{(H \rightarrow 0.5), (h \rightarrow 0.3), (g \rightarrow 0.1), (j \rightarrow 0.1)\} \\ \{(e \rightarrow 0.8), (w \rightarrow 0.1), (r \rightarrow 0.1)\} \end{bmatrix}$$

This encodes the scenario in which the Input Sequence Generator 1 estimates that the user had intended to enter, e.g., the character 'H' followed by the character 'e', so the observed input events would be expected to have the respective probabilities of 0.5 and 0.8. However, the Input Sequence Generator also takes into account that the user may have intended to enter characters other than "H" and "e", by generating a probabilistic string comprising two sets of characters with a probability distribution across the characters of each given set.

The method by which these probability distributions are generated is not the subject of this disclosure. Rather it is highlighted that a range of techniques are applicable, for instance including:

Distributions can be generated on the basis of the characters that surround a given target key on a particular keyboard layout, e.g. for a QWERTY keyboard, if the user tapped the area corresponding to the "H" key, the characters "G" and "J" might be included in the input sequence, with some probability.

Distributions can be generated on the basis of the distances (or some function of the distances, such as the square etc.) between the touch coordinate (on a touchscreen virtual keyboard) and the coordinates of designated keys.

Figure 6:
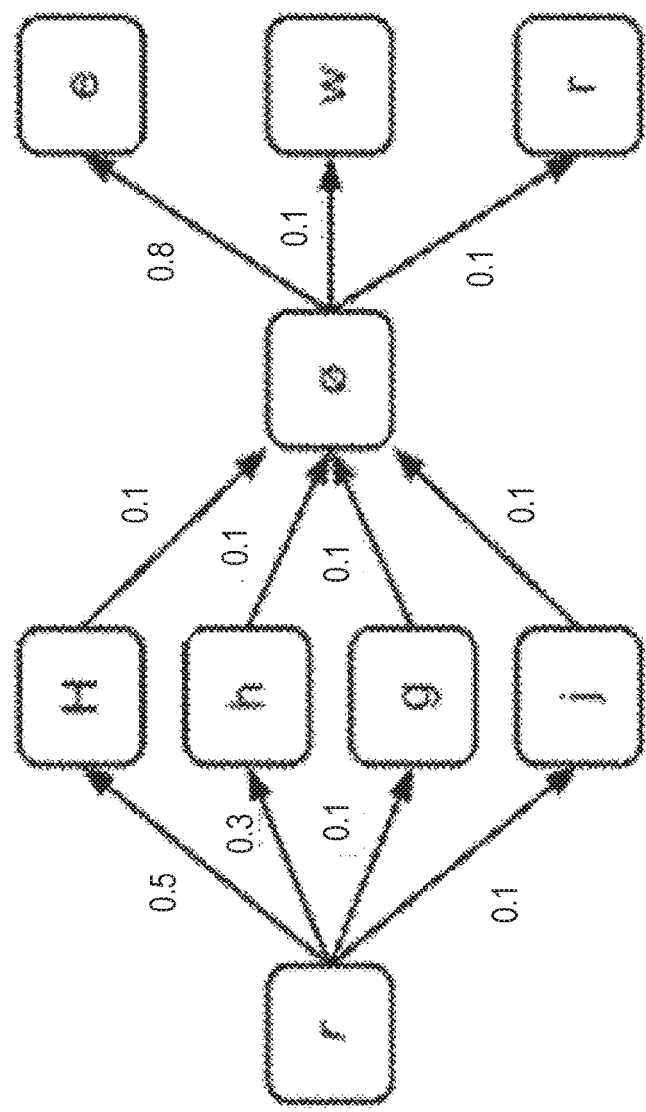
FIG. 6 illustrates an example of an unaugmented probabilistic constrained sequence graph, in accordance with some embodiments.

An unaugmented PCSG generated from the input sequence 20 by the Candidate Generator 2, where each character in each of the sets of characters in the input sequence is assigned its own node in the PCSG, may appear like FIG. 6.

Each set of characters is added as a set of sibling nodes in the graph, which recombine immediately thereafter to a null node, before the next set of sibling nodes. The incoming edge probability for each sibling node corresponds to the probability value of the character in its set.

As stated above, the preferred formulation for the path likelihood, $P(p_j|G)$, amounts to an implicit independence assumption between nodes. In the present case, this is borne out by each character set having a probability distribution across the characters of that set which is independent from the probability distributions across the characters in other character sets. Each set of sibling nodes generated from a character set therefore has a probability distribution which is separate and independent from the other sets of sibling nodes. From the construction of the PCSG, only one such node from each set of sibling nodes can be used in a given path.

Figure 7:
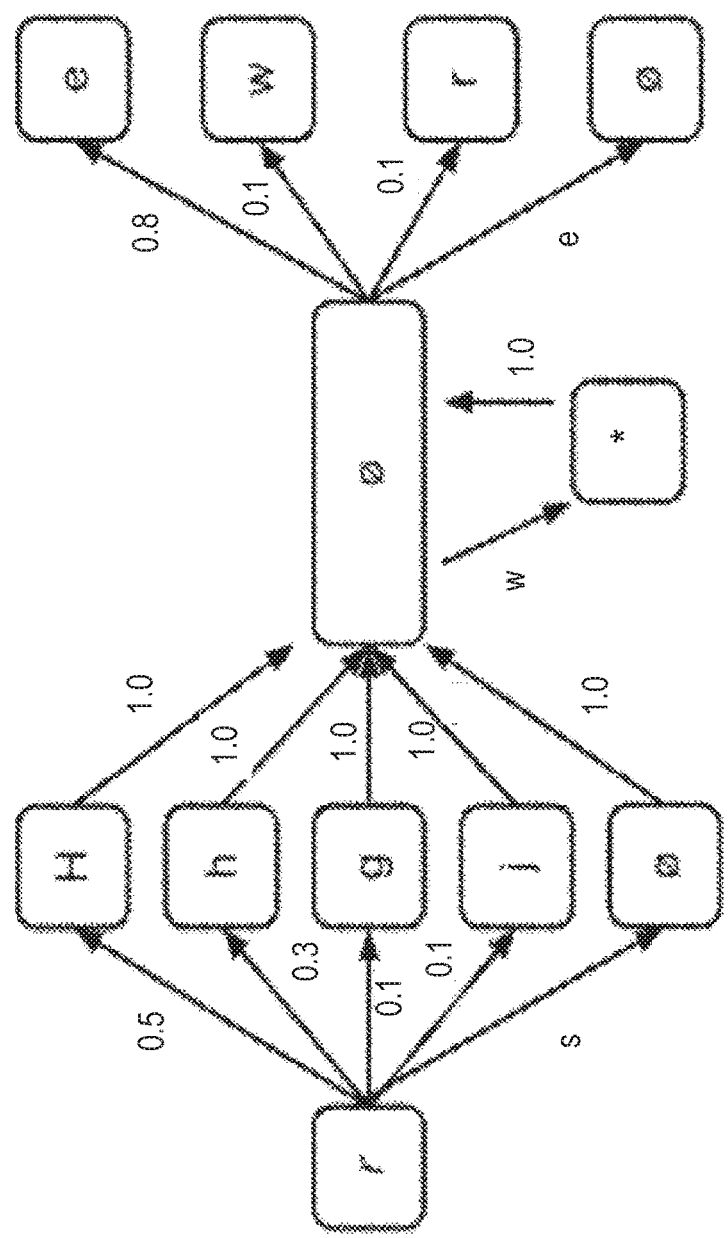
FIG. 7 illustrates an example of an augmented probabilistic constrained sequence graph, in accordance with some embodiments.

As described in PCT/GB2011/001419, which is hereby incorporated by reference in its entirety, the PCSG can be augmented with two additional structures to create an EPCSG which comprises:

an empty node sub-path, which allows for an input sequence with erroneous characters.

a 'wildcard' structure, which allows for instances where the user omitted one or more characters from the target sequence The same PCSG augmented in this way (to provide an EPCSG) is is illustrated in FIG. 7.

With a pre-defined probability penalty, e, the system allows for a null character to be inserted instead of a character corresponding to the input sequence, to deal with erroneous input from a user. To do this, the Candidate Generator 2 is configured to insert a null character (represented by "Ø") node as an additional node in each set of sibling nodes described above. Thus, there are paths through the EPCSG that skip one or more characters by following a path comprising one or more null characters.

Also, with pre-defined penalty, w, the system allows for a character in the target sequence that was omitted entirely in the input. This node marked with '*' is shorthand for a branch containing every possible character in the character set (e.g. a 'wildcard'). In accordance with the EPCSG shown above, the Candidate Generator 2 is configured to insert a wildcard structure (e.g. a node representing a wildcard) between each set of sibling character nodes. This structure allows omitted characters to be considered in the candidate which would not be predicted on the basis of the input alone.

The Candidate Generator 2 of the present system inserts further structures, in the form of term boundaries, into the EPCSG. A term boundary need not be considered a character, such as a space. In some languages, there are no spaces between words, however the system predicts where one word ends and another begins, i.e. it identifies a term boundary. To do this, the Candidate Generator 2 is configured to insert a term boundary (labelled by '_') node as an additional node in each set of sibling nodes described above, in order to correct for the user entering a character rather than a term boundary, e.g. space. Furthermore, the Candidate Generator inserts a further term boundary node between each set of sibling character nodes. Since the term boundary must be considered between arbitrary uses of the wildcard structure, the single wildcard structure must be split into two identical structures, and the term boundary structure inserted within. The term boundary structure simply consists of a term boundary node, and a null character node, which makes the term boundary optional.

Figure 8:
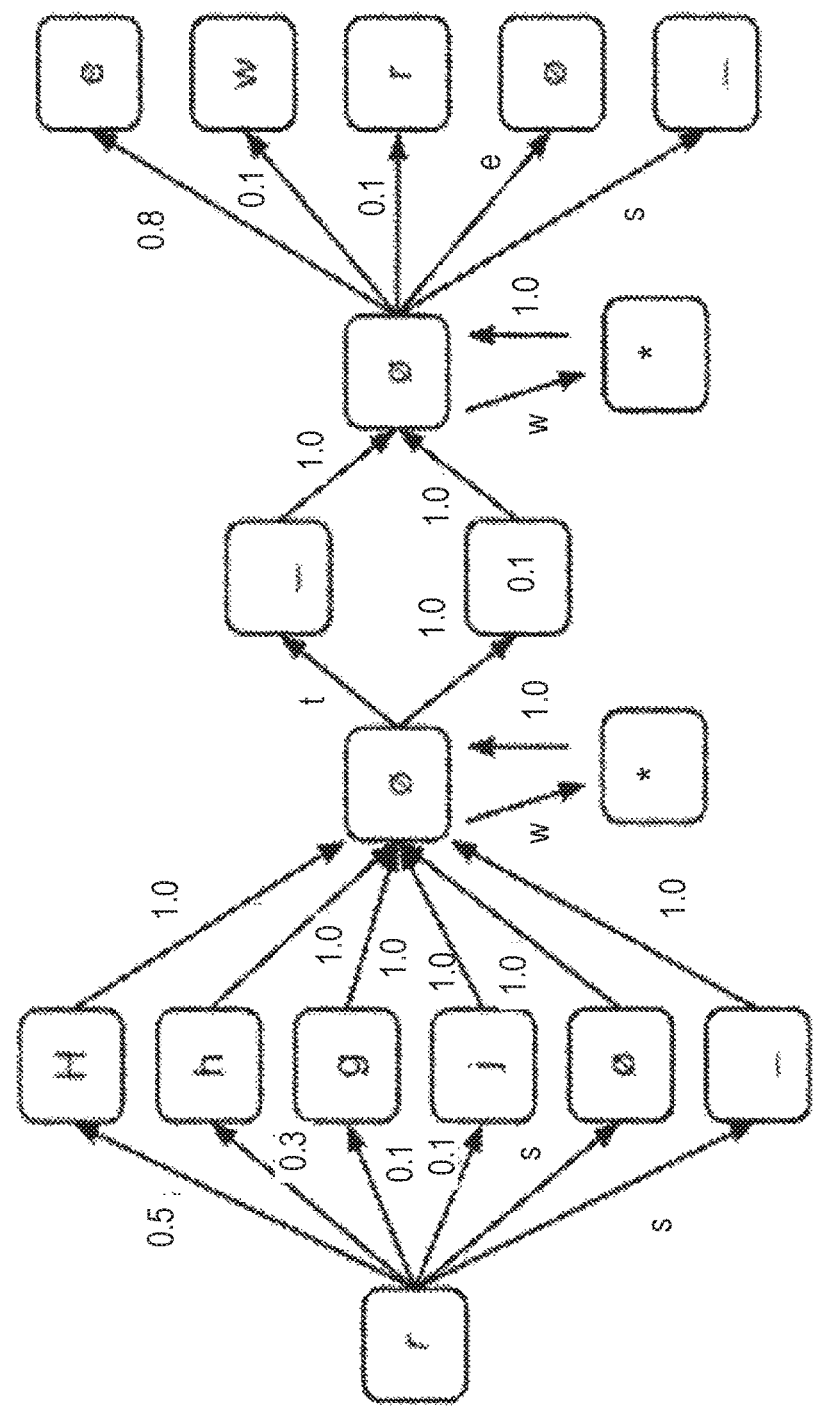
FIG. 8 illustrates an example extended probabilistic constrained sequence graph augmented with term boundary structures in addition to wildcard structures and null character structures, in accordance with some embodiments.

An example EPCSG augmented with term boundary structures in addition to wildcard structures and null character structures is is illustrated in FIG. 8.

These term boundary nodes add two major implications:

with pre-defined probability penalty s, the system can replace an errant character with a term boundary. This models cases where, for example, a user intended to insert a break, but mistakenly added spurious input.

with pre-defined probability penalty t, a term break is allowed to be added between characters, whether generated by the main EPCSG, or by the wildcard branches (which thus exist either side of the term boundary node).

For the edge property, $\forall n \in N$. $\Sigma_{(n \to m) \in E} P(m|n)=1$, to hold the edge probabilities need to be scaled accordingly so that they still sum to 1, which is possible since the probabilities of the inserted structures e, s, t and w are pre-set.

These additional structures in the EPCSG vastly increase the number of possible paths through the graph. To counteract this, the present invention provides a Candidate Generator 2 that uses a novel probabilistic pruning technique that takes into account both the EPCSG path probabilities and the context probability of a sequence of boundary-inferred terms.

The Candidate Generator 2 makes use of the context language model $M_{context}$ to generate a context probability estimate for each multiple-term candidate. The use of $M_{context}$ to generate the context probability estimates for the input candidates clearly violates the assumption that the input evidence (input sequence 20) and the context evidence (context sequence 30) can be separated into non-overlapping sets that are independently generated from some distribution under an associated model ($M_{context}$, $M_{input}$) given the target sequence.

The Candidate Generator 2 is configured to use the context probability estimate for each multiple-term candidate to prune the paths through the EPCSG, which is described in more detail below. The pruning of paths greatly reduces the search space, making the identification of term boundaries in continuous text (without boundaries) computationally possible.

Given a context language model, $M_{context}$, for example a trigram model (an n-gram of size three), which provides probability estimates for $P(t_i)$, $P(t_i\ t_{i-1})$ and $P(t_i\ t_{i-1}, t_{i-2})$, and a k-length sequence to be evaluated, the context probability estimate:

$$P(t_k, t_{k-1}, t_{k-2}, \ldots, t_3, t_2, t_1) \quad (13)$$

is formed by computing:

$$P(t_k|t_{k-1}, t_{k-2})*P(t_{k-1}|t_{k-2}, t_{k-3})* \ldots *P(t_4|t_3, t_2)*P(t_3|t_2, t_1)*P(t_2|t_1)*P(t_1) \quad (14)$$

For example, if the context sequence 30 is "have you ever" and a candidate for the input sequence 20 (i.e. a path through the EPCSG) is "been to London", the Candidate Generator 2 would generate three trigrams: "you ever been", "ever been to", and "been to London". The trigram "have you ever" is composed entirely from the context sequence 30. Any such trigram, being committed input, has a probability of 1, and is thus not considered, as it cannot alter the result. The context probability estimate for this example is then generated by multiplying together the probabilities of each of the three trigrams.

This reflects expression (14) above where the k-length sequence of this example is of length 5, containing {you, ever, been, to, London}.

In the case where there is no context sequence, but the same input sequence, the Candidate Generator 2 would prune the candidate against the context probability estimate of the single trigram "been to London". It follows that with a longer input, e.g. "been to London to see", the candidate would be pruned against the context probability estimate of the three trigrams "been to London", "to London to" "London to see".

Any suitable context language model can be used to provide a probability estimate for a candidate; the present system is not limited to the use of a trigram model, which is used for example purposes.

Thus, the present invention provides pruning that is be based on the entire content of the input sequence, as well terms of the context sequence where there is a context sequence 30.

The use of trained contextual data in this way, can lead to phrases that have not previously been seen by the model, whether intended or not, to be discarded.

To prune paths of the EPCSG, the Candidate Generator is configured to combine the context probability estimate for a given candidate with its accumulated PCSG path probability, by determining the product of the two probabilities. The Candidate Generator 2 sets a lowerbound, via threshold t, on the ratio between the current most probable sequence and the less probable sequences, i.e. the probability ratio between the most probable path and the path being considered for pruning. Thus a path $n_1 \ldots n_L$, is pruned if the following holds:

$$\frac{P(t_k^n, t_{k-1}^n, t_{k-2}^n, \ldots t_3^n, t_2^n, t_1^n)P(n_1|r)\prod_{j=2}^{L} P(n_j|n_{j-1})}{\operatorname{argmax}_m \left[ \begin{array}{c} P(t_k^m, t_{k-1}^m, t_{k-2}^m, \ldots t_3^m, t_2^m, t_1^m) \\ P(m_1|r)\prod_{j=2}^{L} P(m_j|m_{j-1}) \end{array} \right]} < t \quad (15)$$

However, techniques for pruning can be used other than that described above with respect to expressions 14 and 15. The term 'probability estimate' can mean a true mathematical probability or any other form of estimating probability, such as a ranking or scoring. The probability estimate or 'score' assigned to a candidate can be biased towards the earlier terms in the candidate by weighting the terms in expression 14, to enable large swathes of the EPCSG to be disregarded as early as possible, thus increasing computational efficiency as the method does not require traversing across the full EPCSG for all paths. Furthermore, the sequence of terms searched for can be less than the full sequence of terms making up the candidate, e.g. it could comprise the first one or two terms of the candidate. In any event, the score/probability estimate assigned to the candidate will still be determined by searching for a sequence of terms of the candidate in the context model $M_{context}$. Furthermore, other ways of setting the threshold boundary, alternative to expression 15, can be used.

In the preferred embodiment, the Candidate Generator 2 is configured to calculate the probability estimate of expression 14, because it can then prune the input candidates by evaluating the same trigrams that are used to determine the context likelihoods and, in particular, the context sequence estimates. This reduces the number of computations necessary as the trigram results for the non-pruned candidates can be cached and reused (and for pruned candidates, the trigram results can be discarded) by the Candidate Generator 2 as discussed with respect to expression (17) below.

Pruning the paths also reduces the computation of predictions by the Candidate Generator 2 (via equation 11), because there are fewer candidates to evaluate in expressions 12 and 16.

Paths, while they may be likely in the EPCSG, may be pruned by the Candidate Generator 2 on the basis of the context probability estimate. However, were this pruning not done here, the same candidates would proceed to receive an extremely low score from the context model in equation 11 (for precisely the same reason they would have been pruned), and this would give them an extremely low probability, leading to them being discarded at this later stage instead.

Input Sequence Estimate, $P(c_j|s, M_{input-sequence})$

The input sequence estimate: $P(c_j|s, M_{input-sequence})$ is a distribution over candidate sequences given a target sequence, and can be estimated as a normalised indicator function:

$$P(c_j|s, M_{input-sequence}) = \frac{\delta(s, c_j)}{Z} \quad (16)$$

where $\delta(t,t')=1$ if $t'$ is a prefix of $t$ and 0 otherwise, and $Z=\Sigma_k \delta(s, c_k)$, i.e the sum over all candidates.

If uniqueness of candidates is assumed, and the set of candidates is allowed to include all possible sequences, the normalisation factor: $Z=\text{length}(s)$ can be recast, because for a target sequence of length n, there will be precisely n matching prefixes, and thus candidates.

Context Likelihood, $P(\text{context}|s, M_{context})$

The context likelihood, $P(\text{context}|s, M_{context})$, is estimated by means of candidate model 2 and, in particular, expressions (8) and (10) where the evidence source, e, is the context:

$$P(\text{context} \mid s, M_{context}) = \qquad (17)$$

$$\sum_{j=1}^{K} P(s \mid c_j, M_{context\text{-}sequence}) \frac{P(c_j \mid \text{context}, M_{context\text{-}candidate}) P(\text{context} \mid M_{context})}{P(s \mid M_{context})}$$

The sum over j in expression 17 relates to the sum over lexical and orthographic variations of the context. If the input candidates have been discarded at the pruning stage, such variations for this sequence of terms need not be evaluated.

As shown in expression (17), to calculate the context likelihood, the candidate Generator 2 is configured to compute the following estimates, each of which are described in detail below: the context sequence estimate $P(s \mid c_j, M_{context\text{-}sequence})$; the context candidate estimate $P(c_j \mid \text{context}, M_{context\text{-}candidate})$; the context prior estimate $P(\text{context} \mid M_{context})$; and the target sequence prior estimate $P(s \mid M_{context})$.

Context Sequence Estimate, $P(s \mid c_j, M_{context\text{-}sequence})$

The context sequence estimate $P(s \mid c_j, M_{context\text{-}sequence})$ is the probability of the target sequence, s, given a particular candidate sequence, $c_j$, under the context sequence model. Formally the context sequence model is a function that returns the probability of a target sequence given a context sequence, i.e. $f_S(t_{target}, t_{context}) = P(t_{target} \mid t_{context}, \theta_S)$ where $\theta_S$ are the parameters of the model. Thus, the context sequence probability is computed as: $P(s \mid c_j, S) = f_S(s, c_j)$.

There are a number of applicable techniques, used individually or in combination, such as:

An n-gram language model (known in the art)
An adaptive multi-language model, as described in PCT/GB2010/001898 which is hereby incorporated in its entirety.
A PPM (prediction by partial matching) language model, as known in the art
A generative HMM (Hidden Markov Model) probabilistic part-of-speech tagger as known in the art
A suitably configured neural network Context Candidate Estimate, $P(c_j \mid \text{context}, M_{context\text{-}candidate})$ The context candidate estimate $(c_j \mid \text{context}, M_{context\text{-}candidate})$, is a function of the form: $f_{context\text{-}candidate}(t, \text{context}) = P(t \mid \text{context}, \theta_{context\text{-}candidate})$ where t is an arbitrary sequence and $\theta_{context\text{-}candidate}$ are the parameters of the model. Thus, the context candidate conditional estimate is computed as:

$$P(c_j \mid \text{context}, M_{context\text{-}candidate}) = f_{context\text{-}candidate}(c_j, \text{context}).$$

When considering such variation in the context sequence, a technique using EPCSGs is used, in an analogous way to that of the Input Candidate Estimate, with the graph branching now on orthographic variations of context terms (for example, capitalizations, contractions, acronyms).

An example is provided for the following twelve context candidate sequences:

| | | |
|---|---|---|
| "Sunday at 3pm" | "sunday at 3pm" | "Sun at 3pm" |
| "Sunday at 3 pm" | "sunday at 3 pm" | "Sun at 3 pm" |
| "Sunday at 3p.m." | "sunday at 3p.m." | "Sun at 3p.m." |
| "Sunday at 3 p.m." | "sunday at 3 p.m." | "Sun at 3 p.m." |

These would be represented by the PCSG illustrated in FIG. 9a (explicit word boundary denoted by 'l' and the empty sequence by the null character 'ø').

Probabilities are assigned to the edges according to the context candidate model, following (19) as illsutrated in FIG. 9b.

Candidate probabilities for the twelve sequences above are then generated from the PCSG as follows (showing just three examples for brevity):

P("sunday at 3 pm"|"sunday at 3 pm", C)=0.6*1.0*1.0*0.6*1.0*0.7=0.252
P("Sunday at 3 pm"|"sunday at 3 pm", C)=0.3*1.0*1.0*0.4*1.0*0.7=0.084
P("Sun at 3 p.m."|"sunday at 3 pm", C)=0.1*1.0*1.0*0.4*1.0*0.3=0.012

The specifics of the model used to construct the PCSG and assign probabilities to nodes will vary depending on the particular instance of the system. The above schema encodes instances of three general variations:

branch (potentially unambiguously) at word boundaries
branch at case variation
branch at lexical variation It will be understood that any type of variation can be encoded in this framework. Another example would be to branch on previous suggestions, e.g. if the system had predicted both "on" and "in" and the user had selected "in", this can be encoded as a branch with the weight of probability assigned to "in" but with a small probability assigned to "on" to represent the possibility that the user accidentally accepted the wrong suggestion. In the above case, the following principles are encoded:

'sunday' with a lower case initial 's' is less probable than the abbreviated form 'Sun', which is itself less probable than the full variant 'Sunday';
The tokenisation case where "pm" is separated from the number "3" is slightly less probable than the case where it is not;
The period variant "p.m." is somewhat less probable than the non-period form "pm".

A particular instance of the context candidate PCSG is preferably constructed algorithmically from an initial sequence s in the following manner:

Turn s into a PCSG by encapsulating it within a single node $n^s$, connected to the root;
Iteratively deconstruct $n^s$ by introducing branching nodes at variation points.

Figure 10A:
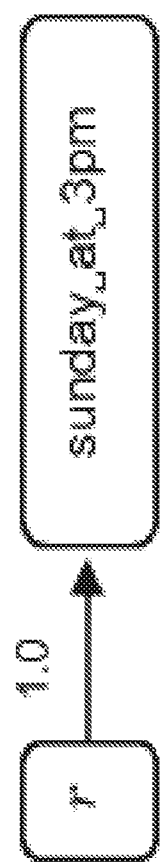

For example, the PCSG construction algorithm operating on an original sequence "sunday at 3 pm" is considered. Step 1 is illustrated in FIG. 10a.

Figure 10B:
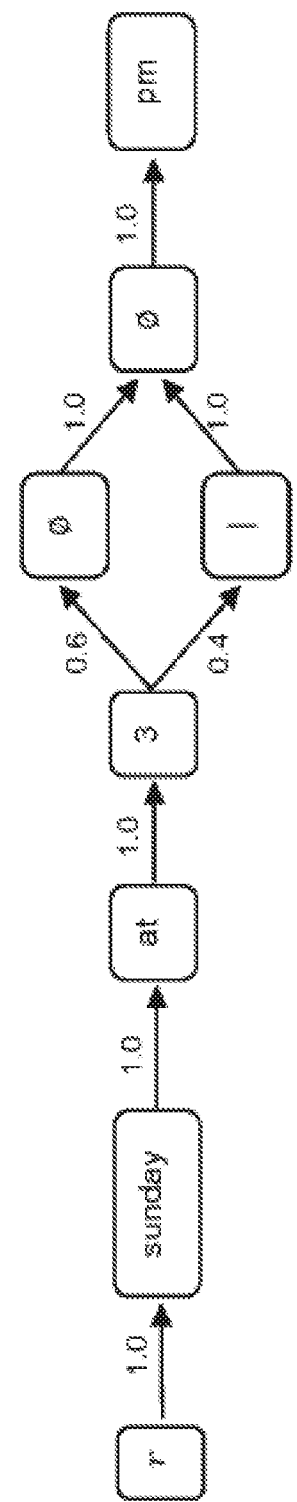

The system deploys a probabilistic tokeniser, resulting in FIG. 10b.

Note that a modification will always take the form of a branch-and-rejoin structural insertion, due to PCSG property 3 above, with the special case being a branch of one node, which is a convenience for subsequent processing as it does not affect overall path probabilities. Edge probabilities are added according to the model, which is explained in further detail below. Continuing the algorithm, a case variant analyser is deployed as illustrated in FIG. 10c.

And finally a lexical variant analyser is deployed as illustrated in FIG. 10d.

Note that due to PCSG property 3, branches must converge before re-branching. This means that in some cases an empty node must be inserted, if two branch points occur contiguously.

Edge probabilities are preferably assigned to the PCSGs. The assignment of edge probabilities is preferably carried out with respect to the parameters of the context candidate model. The intuitive interpretation of these probabilities is twofold:
  (1) They represent an estimate of the likelihood that the user intended the sequence assigned to a particular branch. For example, if a user has entered "Dear ben", we might want to allow, with some probability, that they actually intended to enter "Dear Ben".
  (2) They represent a "backoff" likelihood that a particular branch is a valid orthographic variant of the observed sequence. For example, if the user has entered "See you on Thur", an alternative orthographic form of "Thur" would be "Thurs".

The probability assigned to a particular edge can also be influenced by the estimated likelihood of that orthographic variant given some background model information. For instance, the context sequence model S can actually be reused to obtain an estimate of the likelihood of different orthographic variants, which can be used in combination with other probabilistic measures to yield branch probabilities. Utilising the context sequence model in this manner means that the context candidate model C actually contains an instance of the context sequence model S, which results in an obvious violation of the independence assumption between the candidate and sequence models (property 7 above); however, this assumption is never actually called upon in the context case so it is relatively safe.

An example will help to clarify. In a preferred embodiment, it is assumed that the context candidate model assigns probabilities using the following algorithm:
  Observed sequence receives 0.8 probability; others receive the balance uniformly.
  Values are scaled by the context sequence model estimates.
  Values are normalised to comply with PCSG property (19) above.

Figure 11A:
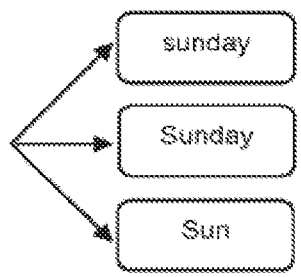
FIGS. 11a, 11b, and 11c illustrate an example of a branch from a probabilistic constrained sequence graph with unnormalized and normalized probabilities, in accordance with some embodiments.

From the above PCSG example, the branch illsutrated in FIG. 11a can be considered.

Figure 11B:
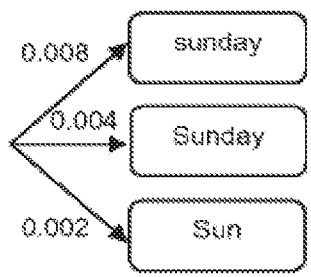
Figure 11C:
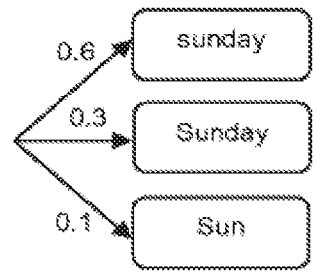

As "sunday" is the original observation, it will initially be assigned a probability of 0.8 by stage one of the above algorithm, and the other edges will each be assigned 0.1. For the example where the estimates returned by the context sequence model are as follow:
  P("sunday"|$C^S$)=0.01
  P("Sunday"|$C^S$)=0.04
  P("Sun"|$C^S$)=0.02
where $C^S$ denotes that the context candidate model is utilising the context sequence model in this case. Thus, in this example the unnormalised and normalised (rounded) probabilities assigned to each edge are illustrated in FIG. 11b and FIG. 11c, respectively.

Context Prior Estimate, P(context|$M_{context}$)

The context prior, P(context|$M_{context}$) can be approximated by normalising the frequency of the original sequence t associated with context $$P(\text{context} | M_{context}) \cong \frac{freq(t)}{\sum_{t'} freq(t')} \quad (21)$$

where freq(t) is the frequency of sequence t in the training data, and the denominator is the sum of the frequencies of all sequences in the training data. The sequence "t" is the context sequence 30. The context prior weights the probability values of context candidates according to the probability that the corresponding model from which the prediction was drawn $M_{context}$, comprises a given context sequence 30. To do this, the context prior weights the predictions values according to the estimate of expression.

In practice, this estimate would be smoothed, for example by estimating a frequency of occurrence of unseen sequences.

Target Sequence Prior Estimate, P(S|$M_{context}$)

Analogously, the target sequence prior, P(s|$M_{context}$), i.e. the denominator of expression (17), can be estimated using smoothed frequency analysis on the training data), e.g. the target sequence prior can be approximated by normalising the frequency of the target sequence over all sequences in the context training data $$P(s | M_{context}) \cong \frac{freq(s)}{\sum_{s'} freq(s')}$$

where freq(s) is the frequency of the target sequence in the training data and the denominator is the sum of all the frequencies of all target sequences in the training data. The denominator can equivalently be approximately determined as the total number of terms in the training data (counting duplicates).

Candidate Display 3

The Candidate Generator 2 is configured to output the highest-ranking candidate as a text prediction, or more than one of the highest-ranking candidates as more than one text predictions, to a candidate display 3 for presentation to the user. The highest-ranking candidates are the candidates that have the highest probability determined by equation (11), where computation of Z is preferred but is optional:

$$\frac{P(s | R)P(\text{context}|s, M_{context})P(\text{input}|s, M_{input})}{Z}$$

In one embodiment, the candidates 40 are displayed on a Candidate Display 3 alongside the virtual keyboard, for selection by a user. When a candidate is selected it replaces the portion of input text corresponding to the Input Sequence 20 from which the candidate was generated.

In an alternative embodiment, the user continues to type without selecting the candidates 40. If, after presenting a multiple-term candidate to a user, they continue to provide input, which does not alter the first term of the highest ranking candidate, this first term can be extracted from the prediction, and "committed" to the composing text (thus also becoming part of context). An example is shown in FIGS. 2a and 2b.

As shown in FIG. 2a, the Candidate Generator 2 may be configured to output to the Candidate Display 3 the two highest-ranking candidates 40, in this case "please call me" and "please call Melanie".

Alternatively, as shown in FIG. 2b, the Candidate Generator 2 may be configured to output to the Candidate Display 3 the highest ranking candidate 40 along with the verbatim input, in this example "call me back" and "calkmebac".

Note that the example user interfaces of FIGS. 2a and 2b do not include the traditional "space bar" key. The disclosed system, in combination with the candidate display and selection interface, allows for a text entry interface that does not need a space bar key. A keyboard without a space-barkey is beneficial because it saves valuable screen space, allowing other keys to take up more space or allowing the screen to be reduced in size.

Example Use of the System

Figure 12:
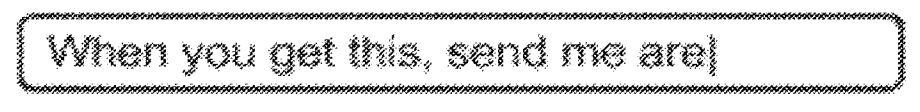

Consider the situation where a user is typing the message "When you get this, send me a reply". Consider further that at some step, our input display field is in the state illustrated in FIG. 12.

In this case, the Input Sequence Generator 1 might output the following context 30 and input 20 sequences:

Context Sequence 30: "When you get this, send me"
Input Sequence 20: {{a, 0.8},{s, 0.1},{z, 0.1} }, {{r, 0.9},{t, 0.05},{f, 0.05} }, {{e, 0.8},{w, 0.2} }

Figure 3:
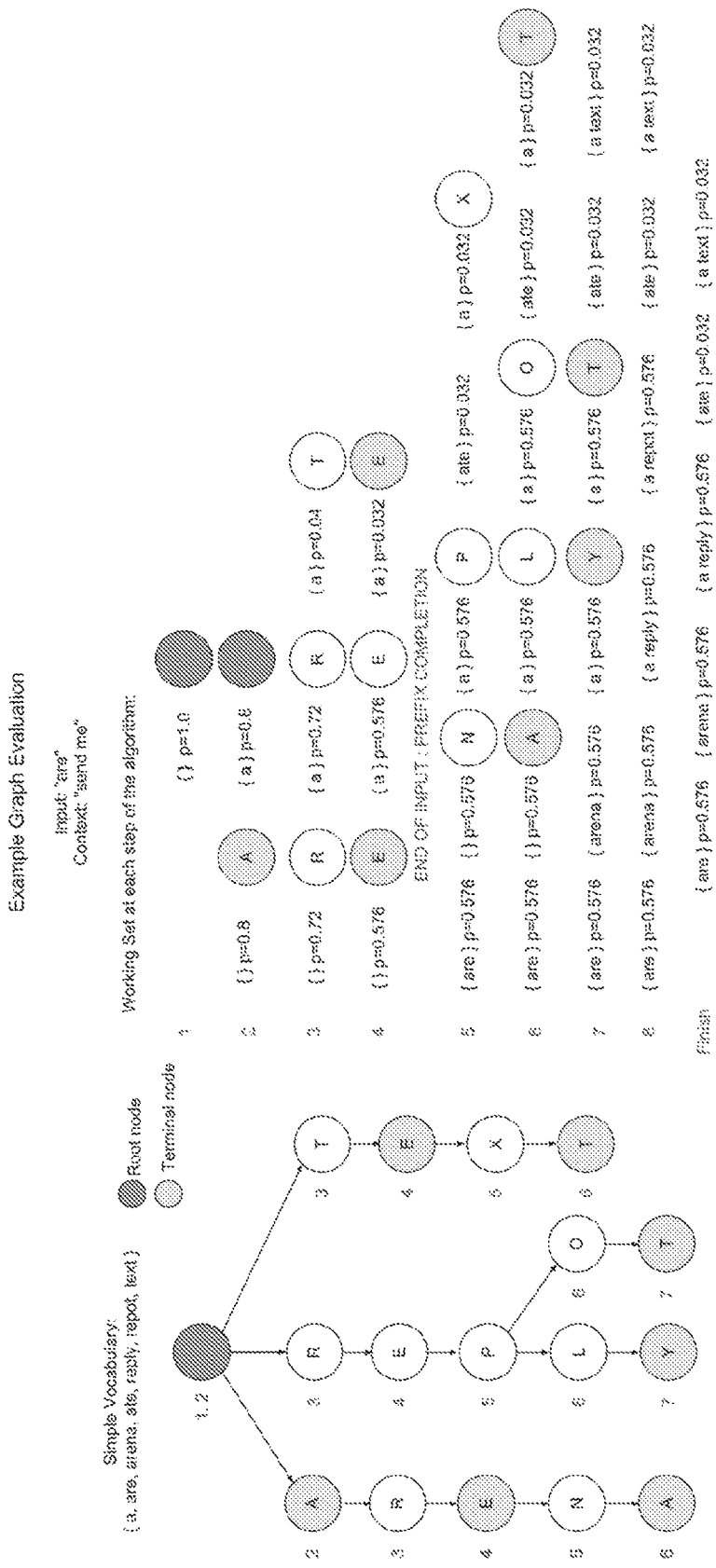
FIG. 3 is a worked example of the use of the system in accordance with the present invention.

As shown in FIG. 3, the Candidate Generator 2 computes the Input Model estimate P(input|s,$M_{input}$) to produce the following candidates, with associated probabilities:
{are, 0.576}
{arena, 0.576}
{ate, 0.032}
{a text, 0.032}
{a reply, 0.576}
{a repot, 0.576}

A visual example of part of the graph evaluation is shown in FIG. 3, highlighting the probabilities of each candidate at each stage of the evaluation.

Note that, as seen in FIG. 3, once the multiple-term "a repot" (a very low probability bigram, compared with "a reply" and "a text") is formed, it is pruned by the Candidate Generator 2 due to its low contextual probability.

At the end of the candidate generation, there are a number of top-scoring candidates which are not the intended sequence.

However, using the context model M context (in this case a trigram model) given the same candidates and the context sequence 30, the Candidate Generator 2 may produce the following candidates, with associated probabilities:
{[send me] are, 0.0000023}
{[send me] arena, 0.000000002}
{[send me] ate, 0.00000007}
{[send me] a text, 0.007}
{[send me] a reply, 0.005}

The most favourable candidate as far as the context is concerned, is actually "a text".

Finally, the probability estimates from the two models are combined by the Candidate Generator 2. These can of course be normalized, if preferred, without affecting their relative rankings, so this is omitted for brevity.

The final example estimates are therefore:
{are, 0.00000132}
{arena, 0.00000000159}
{ate, 0.00000000224}
{a text, 0.000224}
{a reply, 0.00288}

Thus in this basic example, the combined set of models has correctly selected "a reply" as the top prediction, the second prediction being "a text", which is clearly a worthy candidate in the situation, had the user simply hit the R key instead of the T key.

Had the reverse been true, and had the user hit the T key instead of the R key, the distributions of the input probabilistic string (specifically at the second character) would have been reversed in favour of the T character, the top two results would likely simply be reversed. Either way, the intended result is ranked very highly, ready to be presented to the user via Candidate Display 3.

Figure 4:
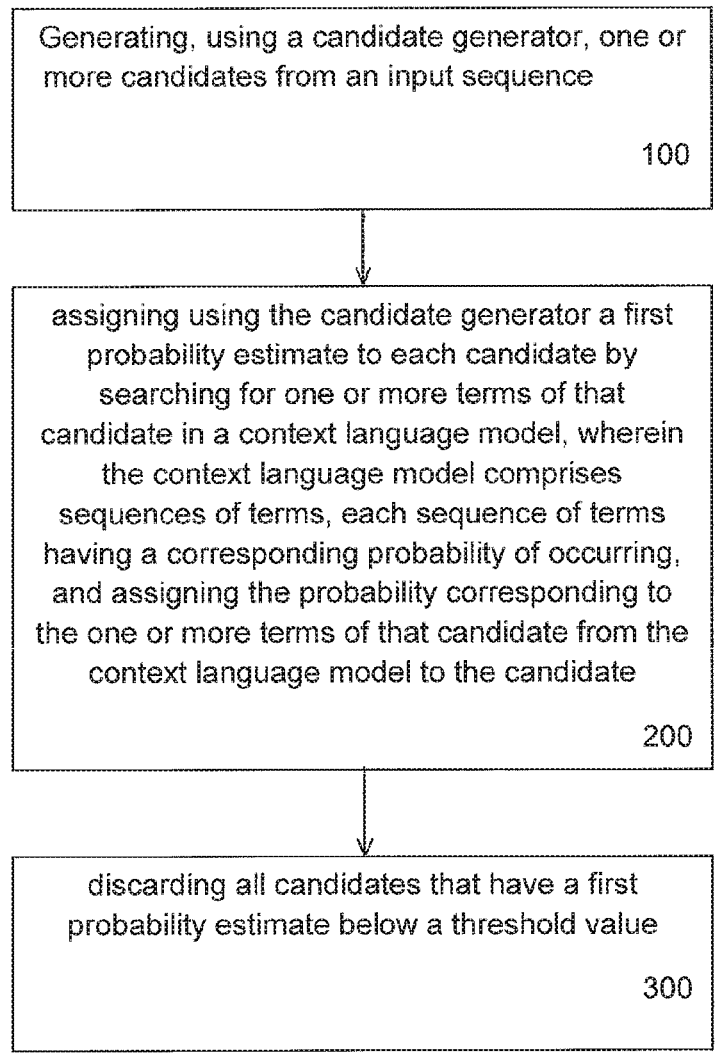
FIG. 4 is a flow-chart of a method in accordance with the present invention.

As discussed in relation to the system and, as illustrated in FIG. 4, the general method comprises generating (100) using a Candidate Generator 2 one or more candidates from the input sequence 20, wherein each candidate comprises two or more terms separated by one or more term boundaries; assigning (200) a first probability estimate to each candidate. A first probability estimate is assigned to each candidate by searching for one or more terms of that candidate in a context language model, wherein the context language model comprises sequences of terms, each sequence of terms has a corresponding probability of occurring, and assigning the probability corresponding to the one or more terms of that candidate from the context language model to the candidate. The final step in the method comprises discarding (300) one or more candidates on the basis of the corresponding first probability estimates.

Other aspects of the method are analogous to the system described above, e.g. in a preferred embodiment of the method, generating one or more candidates comprises generating using the Candidate Generator 2 a probabilistic constrained sequence graph ('PCSG') from the input sequence and inserting term boundary nodes.

As discussed above in relation to a system implementing generalisation structures (and especially a wildcard branch) in a PCSG to determine a context candidate estimate, in a preferred embodiment of the method, at least one of the set of sequence predictions corresponds to an adjusted or corrected version of text input by a user into the user interface.

It will be appreciated that this description is by way of example only; alterations and modifications may be made to the described embodiment without departing from the scope of the invention as defined in the claims.

The invention claimed is:

1. A system comprising:
a processor;
memory storing instructions that, when executed by the processor, configure the system to perform operations comprising:
receive an input sequence comprising a contiguous sequence of characters where the input sequence includes at least incorrectly separated words and a user misspelling;
generate one or more candidates from the input sequence, wherein the candidates comprise two or more candidate terms separated by one or more term boundaries;
search for one or more terms of each candidate in stored sequences of terms, the sequence of terms having a corresponding probability of occurring;
assign a probability to the candidates based on the search and based on text that has been previously committed by a user and specific to the user; and
based on the assigned probability, outputting a likely candidate to a display device, the likely candidate determined while concurrently correcting the user misspelling and the incorrectly separated words, wherein the incorrectly separated words include;
one or more term boundaries that are incorrectly entered,
a spurious character is inserted in place of a term boundary, or
a term boundary that was not entered between two or more words.

2. The system of claim 1, wherein the memory stores instructions that, when executed by the processor, configure the processor to generate a subset of the one or more candidates based on the probability assigned to each candidate.

3. The system of claim 2, wherein the one or more terms comprises the candidate.

4. The system of claim 3, wherein the memory stores instructions that, when executed by the processor, configure the processor to search in the stored sequences for a sequence comprising a context sequence in combination with each candidate, wherein the context sequence is user inputted text that precedes the input sequence and comprises one or more terms separated by one or more term boundaries.

5. The system of claim 4, wherein the memory stores instructions that, when executed by the processor, configure the processor to convert user input signals into an input sequence and a context sequence.

6. The system of claim 2, wherein input sequence is generated from user input signals by generating a sequence of sets of characters, each set of characters having a probability distribution over the characters in the set, such that there is a probability value associated with each character in each set.

7. The system of claim 6, wherein the processor generates one or more candidates from an input sequence by converting the input sequence into a graph comprising one or more paths, wherein the one or more paths correspond to the one or more candidates.

8. The system of claim 7, wherein the graph comprises a collection of nodes and directed edges, each edge connecting one node to another, wherein in the graph each character of each set of characters is assigned a node, the incoming edge for each node corresponding to the probability for the associated character.

9. The system of claim 8, wherein the processor is configured to insert one or more term boundary nodes into the graph, each of the one or more term boundary nodes having a probability of occurring in the input sequence.

10. The system of claim 9, wherein the processor is configured to insert a term boundary node between any two neighbouring nodes which correspond to any two neighbouring sets of characters of the input sequence.

11. The system of claim 9, wherein the processor is configured to insert a term boundary node as an alternative to any node that represents a set of characters of the input sequence.

12. The system of claim 8, wherein the processor is configured to insert one or more wildcard nodes into the graph, each of the one or more wildcard nodes enabling any character to be inserted into the graph in addition to the sets of characters of the input sequence.

13. The system of claim 7, wherein the processor is configured to generate a second probability estimate for the candidate by determining the cumulative probability of the path through the graph that represents that candidate.

14. The system of claim 13, wherein the processor is configured to combine first and second probabilities for each candidate, and include a candidate in the subset of one or more candidates if a ratio of the combined probability for the most probable candidate and the candidate in question is above a threshold value.

15. The system of claim 14, wherein the processor is configured to determine a third probability for any candidate of the subset, wherein the third probability is determined by searching in the stored sequences for a sequence comprising a context sequence, and optionally valid orthographic and lexical variations thereof, in combination with the candidate, wherein the context sequence is user inputted text that precedes the input sequence and comprises one or more terms separated by one or more term boundaries.

16. The system of claim 15, wherein an overall probability of a candidate is the product of the second and third probabilities.

17. The system of claim 16, wherein the processor is configured to output one or more of the most probable candidates of the subset to a candidate display for presentation to a user.

18. The system of claim 1, wherein the processor is configured to output at least one of the one or more candidates to a display for presentation to a user.

19. The system of claim 1, wherein the term boundary is a space character.

20. A method of inferring term boundaries in an input sequence comprising a contiguous sequence of characters, the method comprising:
generating, by a computing device comprising a processor and memory, one or more candidates from the input sequence, wherein the candidates comprise two or more candidate terms separated by one or more term boundaries and where the input sequence at least incorrectly separated words and a user misspelling;
searching, by the computing device, for one or more terms of the candidates in stored sequences of terms, the sequence of terms having a corresponding probability of occurring;
assigning a probability to the candidates based on the search and based on text that has been previously committed by a user and specific to the user; and
based on the assigned probability, outputting a likely candidate on a display device of the computing device, the likely candidate determined while concurrently correcting the user misspelling and the incorrectly separated words, wherein the incorrectly separated words include one or more of:
a failure to enter one or more term boundaries,
one or more term boundaries that are incorrectly entered, or
a spurious character that is inserted in place of a term boundary.

21. The method of claim 20, further comprising generating a subset of the one or more candidates based on the corresponding probability assigned to each candidate.

22. The method of claim 21, wherein the one or more terms comprises the candidate, and for each candidate, the step of searching for the candidate in the stored sequences comprises searching for a sequence comprising a context sequence in combination with the candidate, wherein the context sequence is user inputted text that precedes the input sequence and comprises one or more terms separated by one or more term boundaries.

23. The method of claim 20, wherein the term boundary is a space character.

24. A user interface comprising:
a text pane configured to display text that is currently being entered by a user;
a prediction pane to display a text prediction; and
a virtual keyboard for accepting text entered by a user, wherein the keyboard does not include a key corresponding to a term boundary;
wherein the text prediction is determined based on the text currently entered by a user, text previously entered by the user and specific to the user, two or more candidate terms separated by one or more term boundaries, and stored sequences of terms having a corresponding probability of occurring;
wherein a probability is assigned to the candidate terms based on a search of the stored sequences of terms;

wherein the text prediction is determined while concurrently correcting user misspellings and an incorrectly separated word, wherein the incorrectly separated words include:

a failure to enter one or more term boundaries, incorrectly entering one or more term boundaries, or entering a spurious character in place of a term boundary.

25. The user interface of claim 24, wherein the prediction pane comprises two or more prediction panes, the two or more prediction panes comprising a first prediction pane displaying the user input sequence and a second prediction pane displaying a text prediction for that user input sequence.

\* \* \* \* \*